(12) United States Patent  
Jacob et al.

(10) Patent No.: US 7,542,936 B1
(45) Date of Patent: Jun. 2, 2009

(54) METHOD, APPARATUS AND SYSTEM FOR MARKETING, DELIVERING, AND COLLECTING PAYMENT FOR INFORMATION

(75) Inventors: Karl Jacob, San Francisco, CA (US); Mark Halstead, Berkeley, CA (US); Steven Lurie, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 916 days.

(21) Appl. No.: 09/705,388

(22) Filed: Nov. 2, 2000

(51) Int. Cl.
*G06Q 40/00* (2006.01)
(52) U.S. Cl. .................. 705/37; 705/38; 705/36
(58) Field of Classification Search .............. 705/37, 705/38, 39, 53, 36; 713/201, 185; 709/206, 709/202
See application file for complete search history.

(56) References Cited

U.S. PATENT DOCUMENTS

| | | | |
|---|---|---|---|
| 4,313,035 A | 1/1982 | Jordan et al. |
| 4,577,065 A | 3/1986 | Frey et al. |
| 4,631,428 A | 12/1986 | Grimes |
| 4,645,873 A | 2/1987 | Chomet |
| 4,677,434 A | 6/1987 | Fascenda |
| 4,723,283 A | 2/1988 | Nagasawa et al. |
| 4,751,669 A | 6/1988 | Sturgis et al. |
| 4,752,675 A | 6/1988 | Zetmeir |
| 4,847,890 A | 7/1989 | Solomon et al. |
| 4,878,239 A | 10/1989 | Solomon et al. |
| 4,969,185 A | 11/1990 | Dorst et al. |
| 5,017,917 A | 5/1991 | Fisher et al. |
| 5,058,152 A | 10/1991 | Solomon et al. |
| 5,099,510 A | 3/1992 | Blinken, Jr. et al. |
| 5,148,474 A | 9/1992 | Haralambopoulos et al. |
| 5,155,743 A | 10/1992 | Jacobs |
| 5,155,761 A | 10/1992 | Hammond |
| 5,206,903 A | 4/1993 | Kohler et al. |
| 5,319,542 A | 6/1994 | King, Jr. et al. |
| 5,325,424 A | 6/1994 | Grube |
| 5,339,358 A | 8/1994 | Danish et al. |
| 5,347,632 A | 9/1994 | Filepp et al. |
| 5,359,508 A | 10/1994 | Rossides |

(Continued)

FOREIGN PATENT DOCUMENTS

AU 699785 5/1995

(Continued)

OTHER PUBLICATIONS

Mailround: Mailround, email marketing and technology provider launches to consumers M2 Presswire. Coventry: Oct. 3, 2000. p. 1.*

(Continued)

*Primary Examiner*—Frantzy Poinvil
*Assistant Examiner*—Clement Graham
(74) *Attorney, Agent, or Firm*—John P. Ward; Greenberg Traurig, LLP

(57) ABSTRACT

A method, apparatus and system for marketing, delivering, and collecting payment for information is described. In one embodiment, the invention is a method of providing electronic mail for payment. The invention includes sending an electronic mail message including provided information and a price to a customer, the provided information having an inaccessible portion of information. The invention further includes transferring a payment from the customer, and rendering the inaccessible portion of information accessible to the customer.

76 Claims, 9 Drawing Sheets

U.S. PATENT DOCUMENTS

| | | | |
|---|---|---|---|
| 5,361,295 A | 11/1994 | Solomon et al. | |
| 5,369,694 A | 11/1994 | Bales et al. | |
| 5,448,625 A | 9/1995 | Lederman | |
| 5,453,352 A | 9/1995 | Tachibana | |
| 5,459,779 A | 10/1995 | Backaus et al. | |
| 5,469,497 A | 11/1995 | Pierce et al. | |
| 5,483,352 A | 1/1996 | Fukuyama et al. | |
| 5,497,502 A | 3/1996 | Castille | |
| 5,524,146 A | 6/1996 | Morrisey et al. | |
| 5,537,314 A | 7/1996 | Kanter | |
| 5,539,735 A | 7/1996 | Moskowitz | |
| 5,555,298 A | 9/1996 | Jonsson | |
| 5,557,677 A | 9/1996 | Prytz | |
| 5,574,780 A | 11/1996 | Andruska et al. | |
| 5,574,781 A | 11/1996 | Blaze | |
| 5,589,892 A | 12/1996 | Knee et al. | |
| 5,590,197 A | 12/1996 | Chen et al. | |
| 5,596,634 A | 1/1997 | Fernandez et al. | |
| 5,602,905 A | 2/1997 | Mettke | |
| 5,604,803 A | 2/1997 | Aziz | |
| 5,608,786 A | 3/1997 | Gordon | |
| 5,615,213 A | 3/1997 | Griefer | |
| 5,619,148 A | 4/1997 | Guo | |
| 5,619,555 A | 4/1997 | Fenton et al. | |
| 5,619,570 A | 4/1997 | Tsutsui | |
| 5,619,725 A | 4/1997 | Gordon | |
| 5,619,991 A | 4/1997 | Sloane | |
| 5,623,536 A | 4/1997 | Solomon et al. | |
| 5,634,012 A | 5/1997 | Stefik et al. | |
| 5,638,432 A | 6/1997 | Wille et al. | |
| 5,644,715 A | 7/1997 | Baugher | |
| 5,651,058 A | 7/1997 | Hackett-Jones et al. | |
| 5,668,953 A | 9/1997 | Sloo | |
| 5,675,734 A | 10/1997 | Hair | |
| 5,689,553 A | 11/1997 | Ahuja et al. | |
| 5,694,163 A | 12/1997 | Harrison | |
| 5,694,537 A | 12/1997 | Montenegro et al. | |
| 5,694,549 A | 12/1997 | Carlin et al. | |
| 5,701,419 A | 12/1997 | McConnell | |
| 5,710,887 A | 1/1998 | Chelliah et al. | |
| 5,712,979 A | 1/1998 | Graber et al. | |
| 5,715,314 A | 2/1998 | Payne et al. | |
| 5,717,860 A | 2/1998 | Graber et al. | |
| 5,718,247 A | 2/1998 | Frankel | |
| 5,721,763 A | 2/1998 | Joseph et al. | |
| 5,722,418 A | 3/1998 | Bro | |
| 5,724,424 A | 3/1998 | Gifford | |
| 5,724,521 A | 3/1998 | Dedrick | |
| 5,734,961 A | 3/1998 | Castille | |
| 5,740,231 A | 4/1998 | Cohn et al. | |
| 5,740,549 A | 4/1998 | Reilly et al. | |
| 5,745,681 A | 4/1998 | Levine et al. | |
| 5,768,348 A | 6/1998 | Solomon et al. | |
| 5,768,521 A | 6/1998 | Dedrick | |
| 5,774,534 A | 6/1998 | Mayer | |
| 5,778,367 A | 7/1998 | Wesinger, Jr. et al. | |
| 5,781,894 A | 7/1998 | Patrecca et al. | |
| 5,794,210 A | 8/1998 | Goldhaber et al. | |
| 5,794,221 A | 8/1998 | Egendorf | |
| 5,802,502 A | 9/1998 | Gell et al. | |
| 5,809,119 A | 9/1998 | Tonomura et al. | |
| 5,809,145 A | 9/1998 | Slik et al. | |
| 5,812,769 A | 9/1998 | Graber et al. | |
| 5,818,836 A | 10/1998 | DuVal | |
| 5,819,092 A | 10/1998 | Ferguson et al. | |
| 5,819,267 A | 10/1998 | Uyama | |
| 5,819,271 A | 10/1998 | Mahoney et al. | |
| 5,819,285 A | 10/1998 | Damico et al. | |
| 5,825,869 A | 10/1998 | Brooks et al. | |
| 5,825,876 A | 10/1998 | Peterson, Jr. | |
| 5,832,523 A | 11/1998 | Kanai et al. | |
| 5,835,896 A | 11/1998 | Fisher et al. | |
| 5,841,763 A | 11/1998 | Leondires et al. | |
| 5,842,212 A | 11/1998 | Ballurio et al. | |
| 5,845,265 A * | 12/1998 | Woolston | 705/37 |
| 5,850,433 A | 12/1998 | Rondeau | |
| 5,860,068 A | 1/1999 | Cook | |
| 5,862,223 A | 1/1999 | Walker et al. | |
| 5,864,871 A | 1/1999 | Kitain et al. | |
| 5,870,744 A | 2/1999 | Sprague | |
| 5,878,130 A | 3/1999 | Andrews et al. | |
| 5,884,032 A | 3/1999 | Bateman et al. | |
| 5,884,272 A | 3/1999 | Walker et al. | |
| 5,884,282 A | 3/1999 | Robinson | |
| 5,889,774 A | 3/1999 | Mirashrafi et al. | |
| 5,890,138 A | 3/1999 | Godin et al. | |
| 5,893,077 A | 4/1999 | Griffin | |
| 5,901,214 A | 5/1999 | Shaffer et al. | |
| 5,903,635 A | 5/1999 | Kaplan | |
| 5,903,877 A | 5/1999 | Berkowitz et al. | |
| 5,907,677 A | 5/1999 | Glenn et al. | |
| 5,911,132 A | 6/1999 | Sloane | |
| 5,914,951 A | 6/1999 | Bentley et al. | |
| 5,915,214 A | 6/1999 | Reece et al. | |
| 5,924,082 A | 7/1999 | Silverman et al. | |
| 5,937,390 A | 8/1999 | Hyodo | |
| 5,940,471 A | 8/1999 | Homayoun | |
| 5,940,484 A | 8/1999 | DeFazio et al. | |
| 5,943,422 A * | 8/1999 | Van Wie et al. | 705/54 |
| 5,946,646 A | 8/1999 | Schena et al. | |
| 5,948,054 A | 9/1999 | Nielsen | |
| 5,960,416 A | 9/1999 | Block | |
| 5,974,141 A | 10/1999 | Saito | |
| 5,974,398 A | 10/1999 | Hanson et al. | |
| 5,982,863 A | 11/1999 | Smiley et al. | |
| 5,987,102 A | 11/1999 | Elliott et al. | |
| 5,987,118 A | 11/1999 | Dickerman et al. | |
| 5,987,430 A | 11/1999 | Van Horne et al. | |
| 5,991,394 A | 11/1999 | Dezonno et al. | |
| 5,999,609 A | 12/1999 | Nishimura | |
| 5,999,611 A | 12/1999 | Tatchell et al. | |
| 6,006,197 A | 12/1999 | d-Eon et al. | |
| 6,011,794 A | 1/2000 | Mordowitz et al. | |
| 6,014,439 A | 1/2000 | Walker et al. | |
| 6,014,644 A | 1/2000 | Erickson | |
| 6,016,478 A | 1/2000 | Zhang et al. | |
| 6,026,087 A | 2/2000 | Mirashrafi et al. | |
| 6,026,148 A | 2/2000 | Dworkin et al. | |
| 6,026,400 A | 2/2000 | Suzuki | |
| 6,028,601 A | 2/2000 | Machiraju et al. | |
| 6,029,141 A | 2/2000 | Bezos et al. | |
| 6,035,021 A | 3/2000 | Katz | |
| 6,046,762 A | 4/2000 | Sonesh et al. | |
| 6,055,513 A | 4/2000 | Katz et al. | |
| 6,058,379 A | 5/2000 | Odom et al. | |
| 6,064,978 A | 5/2000 | Gardener et al. | |
| 6,067,561 A | 5/2000 | Dillon | |
| 6,078,866 A | 6/2000 | Buck et al. | |
| 6,108,493 A | 8/2000 | Miller et al. | |
| 6,130,933 A | 10/2000 | Miloslavsky | |
| 6,131,085 A | 10/2000 | Rossides | |
| 6,144,670 A | 11/2000 | Sponaugle et al. | |
| 6,167,379 A | 12/2000 | Dean et al. | |
| 6,167,449 A | 12/2000 | Arnold et al. | |
| 6,173,279 B1 | 1/2001 | Levin et al. | |
| 6,175,619 B1 | 1/2001 | DeSimone | |
| 6,185,194 B1 | 2/2001 | Musk et al. | |
| 6,185,289 B1 | 2/2001 | Hetz et al. | |
| 6,188,673 B1 | 2/2001 | Bauer et al. | |
| 6,188,761 B1 | 2/2001 | Dickerman et al. | |
| 6,192,050 B1 | 2/2001 | Stovall | |
| 6,199,096 B1 | 3/2001 | Mirashrafi et al. | |
| 6,212,192 B1 | 4/2001 | Mirashrafi et al. | |
| 6,212,268 B1 | 4/2001 | Nielsen | |

| | | | | | | |
|---|---|---|---|---|---|---|
| 6,216,111 B1 | 4/2001 | Walker et al. | | 6,798,753 B1 | 9/2004 | Doganata et al. |
| 6,223,165 B1 | 4/2001 | Lauffer | | 6,801,899 B1 | 10/2004 | Lauffer |
| 6,230,287 B1 | 5/2001 | Pinard et al. | | 6,807,532 B1 | 10/2004 | Kolls |
| 6,233,566 B1 * | 5/2001 | Levine et al. ............... 705/37 | | 6,807,571 B2 | 10/2004 | Hatano et al. |
| 6,243,684 B1 | 6/2001 | Stuart et al. | | 6,836,225 B2 | 12/2004 | Lee et al. |
| 6,246,875 B1 | 6/2001 | Seazholtz et al. | | 6,839,737 B1 | 1/2005 | Friskel |
| 6,248,946 B1 | 6/2001 | Dwek | | 6,865,540 B1 | 3/2005 | Faber et al. |
| 6,259,774 B1 | 7/2001 | Miloslavsky et al. | | 6,898,435 B2 | 5/2005 | Milman |
| 6,266,651 B1 * | 7/2001 | Woolston ............... 705/27 | | 6,910,159 B2 | 6/2005 | Phillips et al. |
| 6,269,336 B1 | 7/2001 | Ladd et al. | | 6,968,174 B1 | 11/2005 | Trandal et al. |
| 6,269,361 B1 | 7/2001 | Davis et al. | | 6,990,183 B2 | 1/2006 | Holland et al. |
| 6,282,515 B1 | 8/2001 | Speicher | | 7,031,697 B2 | 4/2006 | Yang et al. |
| 6,292,799 B1 | 9/2001 | Peek et al. | | 7,032,030 B1 | 4/2006 | Condignotto |
| 6,298,056 B1 | 10/2001 | Pendse | | 7,046,782 B2 | 5/2006 | Miller |
| 6,301,342 B1 | 10/2001 | Ander et al. | | 7,212,615 B2 | 5/2007 | Wolmuth |
| 6,301,350 B1 | 10/2001 | Henningson et al. | | 7,224,781 B2 | 5/2007 | Jacob et al. |
| 6,304,637 B1 | 10/2001 | Mirashrafi et al. | | 2001/0012357 A1 | 8/2001 | Mirashrafi et al. |
| 6,310,941 B1 | 10/2001 | Crutcher et al. | | 2001/0025274 A1 | 9/2001 | Zehr et al. |
| 6,311,231 B1 | 10/2001 | Bateman et al. | | 2001/0026609 A1 | 10/2001 | Weinstein et al. |
| 6,314,402 B1 | 11/2001 | Monaco et al. | | 2001/0027481 A1 | 10/2001 | Whyel |
| 6,314,454 B1 * | 11/2001 | Wang et al. ............... 709/206 | | 2001/0029482 A1 | 10/2001 | Tealdi et al. |
| 6,323,894 B1 | 11/2001 | Katz | | 2001/0032247 A1 | 10/2001 | Kanaya |
| 6,353,663 B1 | 3/2002 | Stevens et al. | | 2001/0036822 A1 | 11/2001 | Mead et al. |
| 6,381,325 B1 | 4/2002 | Hanson | | 2001/0037283 A1 | 11/2001 | Mullaney |
| 6,385,583 B1 | 5/2002 | Ladd et al. | | 2001/0044751 A1 | 11/2001 | Pugliese et al. |
| 6,389,278 B1 | 5/2002 | Singh | | 2001/0048737 A1 | 12/2001 | Goldberg et al. |
| 6,389,541 B1 * | 5/2002 | Patterson ............... 713/201 | | 2002/0003867 A1 | 1/2002 | Rothschild et al. |
| 6,393,117 B1 | 5/2002 | Trell | | 2002/0010608 A1 | 1/2002 | Faber et al. |
| 6,393,412 B1 | 5/2002 | Deep | | 2002/0010616 A1 | 1/2002 | Itzhaki |
| 6,400,806 B1 | 6/2002 | Uppaluru | | 2002/0024948 A1 | 2/2002 | Pendse |
| 6,404,864 B1 | 6/2002 | Evslin et al. | | 2002/0029241 A1 | 3/2002 | Yokono et al. |
| 6,404,877 B1 | 6/2002 | Bolduc et al. | | 2002/0038233 A1 | 3/2002 | Shubov et al. |
| 6,404,884 B1 | 6/2002 | Marwell et al. | | 2002/0038293 A1 | 3/2002 | Seiden |
| 6,408,278 B1 | 6/2002 | Carney et al. | | 2002/0042826 A1 | 4/2002 | Gaus et al. |
| 6,430,276 B1 | 8/2002 | Bouvier et al. | | 2002/0059082 A1 | 5/2002 | Moczygemba |
| 6,434,527 B1 | 8/2002 | Horvitz | | 2002/0065959 A1 | 5/2002 | Kim et al. |
| 6,461,162 B1 | 10/2002 | Reitman et al. | | 2002/0071423 A1 | 6/2002 | Mirashrafi et al. |
| 6,463,136 B1 | 10/2002 | Malik | | 2002/0071426 A1 | 6/2002 | Karamchedu et al. |
| 6,470,079 B1 | 10/2002 | Benson | | 2002/0072974 A1 | 6/2002 | Pugliese et al. |
| 6,470,317 B1 | 10/2002 | Ladd et al. | | 2002/0073207 A1 | 6/2002 | Widger et al. |
| 6,470,338 B1 | 10/2002 | Rizzo et al. | | 2002/0087565 A1 | 7/2002 | Hoekman et al. |
| 6,477,246 B1 | 11/2002 | Dolan et al. | | 2002/0091607 A1 | 7/2002 | Sloan et al. |
| 6,484,148 B1 | 11/2002 | Boyd | | 2002/0094074 A1 | 7/2002 | Lurie |
| 6,493,437 B1 | 12/2002 | Olshansky | | 2002/0095331 A1 | 7/2002 | Osmar et al. |
| 6,493,671 B1 | 12/2002 | Ladd et al. | | 2002/0095359 A1 | 7/2002 | Mangetsu |
| 6,493,673 B1 | 12/2002 | Ladd et al. | | 2002/0107697 A1 | 8/2002 | Jensen |
| 6,504,920 B1 | 1/2003 | Okon et al. | | 2002/0112005 A1 | 8/2002 | Namias |
| 6,510,417 B1 | 1/2003 | Woods et al. | | 2002/0116266 A1 | 8/2002 | Marshall |
| 6,513,013 B1 | 1/2003 | Stephanou | | 2002/0120554 A1 | 8/2002 | Vega |
| 6,519,570 B1 | 2/2003 | Faber et al. | | 2002/0128891 A1 | 9/2002 | McSherry |
| 6,523,010 B2 | 2/2003 | Lauffer | | 2002/0133402 A1 | 9/2002 | Faber et al. |
| 6,529,878 B2 | 3/2003 | De Rafael et al. | | 2002/0133570 A1 | 9/2002 | Jacob et al. |
| 6,539,359 B1 | 3/2003 | Ladd et al. | | 2002/0133571 A1 | 9/2002 | Jacob et al. |
| 6,542,732 B1 | 4/2003 | Khazaka et al. | | 2002/0169836 A1 | 11/2002 | Hood et al. |
| 6,546,372 B2 | 4/2003 | Lauffer | | 2002/0191762 A1 | 12/2002 | Benson |
| 6,549,889 B2 | 4/2003 | Lauffer | | 2002/0193094 A1 | 12/2002 | Lawless et al. |
| 6,560,576 B1 | 5/2003 | Cohen et al. | | 2002/0193135 A1 | 12/2002 | Nakano |
| 6,563,915 B1 | 5/2003 | Salimando | | 2003/0005126 A1 | 1/2003 | Schwartz et al. |
| 6,606,376 B1 | 8/2003 | Trell | | 2003/0041255 A1 | 2/2003 | Chen et al. |
| 6,609,106 B1 | 8/2003 | Robertson | | 2003/0043981 A1 | 3/2003 | Lurie et al. |
| 6,611,501 B1 | 8/2003 | Owen et al. | | 2003/0046161 A1 | 3/2003 | Kamanger et al. |
| 6,625,595 B1 | 9/2003 | Anderson et al. | | 2003/0061094 A1 | 3/2003 | Banerjee et al. |
| 6,636,590 B1 | 10/2003 | Jacob et al. | | 2003/0112944 A1 | 6/2003 | Brown et al. |
| 6,658,389 B1 | 12/2003 | Alpdemir | | 2003/0115089 A1 | 6/2003 | Lurie |
| 6,668,286 B2 | 12/2003 | Bateman et al. | | 2003/0126205 A1 | 7/2003 | Lurie |
| 6,691,093 B2 | 2/2004 | Shell | | 2003/0220866 A1 | 11/2003 | Pisaris-Henderson |
| 6,704,403 B2 | 3/2004 | Lurie et al. | | 2003/0223565 A1 | 12/2003 | Montemer |
| 6,731,625 B1 | 5/2004 | Eastep et al. | | 2003/0225682 A1 | 12/2003 | Montemer |
| 6,732,183 B1 | 5/2004 | Graham | | 2004/0006511 A1 | 1/2004 | Montemer |
| 6,741,691 B1 | 5/2004 | Ritter et al. | | 2004/0010518 A1 | 1/2004 | Montemer |
| 6,757,364 B2 | 6/2004 | Newkirk | | 2004/0023644 A1 | 2/2004 | Montemer |
| 6,771,760 B1 | 8/2004 | Vortman et al. | | 2004/0038673 A1 | 2/2004 | Dunn et al. |
| 6,775,359 B1 | 8/2004 | Ron et al. | | 2004/0066927 A1 | 4/2004 | Horvath et al. |

| | | | |
|---|---|---|---|
| 2004/0083133 A1 | 4/2004 | Nicholas et al. | |
| 2004/0096110 A1 | 5/2004 | Yogeshwar et al. | |
| 2004/0162757 A1 | 8/2004 | Pisaris-Henderson | |
| 2004/0196833 A1 | 10/2004 | Dahan et al. | |
| 2004/0204997 A1 | 10/2004 | Blaser et al. | |
| 2004/0234049 A1 | 11/2004 | Melideo | |
| 2004/0234064 A1 | 11/2004 | Melideo | |
| 2004/0236441 A1 | 11/2004 | Melideo | |
| 2004/0252820 A1 | 12/2004 | Faber et al. | |
| 2004/0254859 A1 | 12/2004 | Aslanian, Jr. | |
| 2004/0258048 A1 | 12/2004 | Melideo | |
| 2004/0260413 A1 | 12/2004 | Melideo | |
| 2005/0010795 A1 | 1/2005 | Tagawa et al. | |
| 2005/0021744 A1 | 1/2005 | Haitsuka et al. | |
| 2005/0044238 A1 | 2/2005 | Jacob et al. | |
| 2005/0048961 A1 | 3/2005 | Ribaudo et al. | |
| 2005/0065811 A1 | 3/2005 | Chu et al. | |
| 2005/0071509 A1 | 3/2005 | Faber et al. | |
| 2005/0080878 A1 | 4/2005 | Cunningham et al. | |
| 2005/0086104 A1 | 4/2005 | McFadden | |
| 2005/0114210 A1 | 5/2005 | Faber et al. | |
| 2005/0119957 A1 | 6/2005 | Faber et al. | |
| 2005/0165666 A1 | 7/2005 | Wong et al. | |
| 2005/0203799 A1 | 9/2005 | Faber et al. | |
| 2005/0209874 A1 | 9/2005 | Rossini | |
| 2005/0216341 A1 | 9/2005 | Altberg et al. | |
| 2005/0216345 A1 | 9/2005 | Altberg et al. | |
| 2005/0220289 A1 | 10/2005 | Reding | |
| 2005/0222908 A1 | 10/2005 | Altberg et al. | |
| 2005/0251445 A1 | 11/2005 | Wong et al. | |
| 2006/0031516 A1 | 2/2006 | Kumer | |
| 2006/0095343 A1 | 5/2006 | Clark et al. | |
| 2006/0184378 A1 | 8/2006 | Agarwal et al. | |
| 2006/0215826 A1 | 9/2006 | Lurie et al. | |

FOREIGN PATENT DOCUMENTS

| | | | |
|---|---|---|---|
| EP | 04253389.3 | | 9/2004 |
| EP | 1489529 | | 12/2004 |
| GB | 2329046 | A | 10/1999 |
| JP | 409233441 | A | 9/1997 |
| JP | 409319812 | A | 12/1997 |
| JP | 2002007887 | | 1/2002 |
| WO | WO 97/05733 | | 2/1997 |
| WO | WO 98/02835 | | 1/1998 |
| WO | WO 98/04061 | | 1/1998 |
| WO | WO 98/13765 | | 4/1998 |
| WO | WO 98/38558 | | 9/1998 |
| WO | 0057326 | | 9/2000 |
| WO | WO 00/73960 | | 12/2000 |
| WO | WO 01/01217 | | 1/2001 |
| WO | 0120518 | | 3/2001 |
| WO | 0127825 | | 4/2001 |
| WO | WO 01/28141 | | 4/2001 |
| WO | WO 01/44973 | | 6/2001 |
| WO | 0184415 | | 11/2001 |
| WO | PCT/US01/51181 | | 11/2001 |
| WO | 0213110 | | 2/2002 |
| WO | 0237470 | | 5/2002 |
| WO | WO 02/44870 | A2 | 6/2002 |
| WO | 2005109287 | | 11/2005 |

OTHER PUBLICATIONS

Attachmate Ready to Answer 'Net questions, Network World, Apr. 8, 1996 37.
US Courts to Launch First Federal 900 Service, Federal Computer Week, Sep. 28, 1992, 8.
Company Devoted to Hot-Line Support, Computer Reseller News, Oct. 21, 1991, 48.
For Telesphere's Clients, Dial '1-900 TUF LUCK',Business Week, Sep. 9, 1991, 88.
When Business Plan and real World Clash, Wall Street Journal, Jun. 9, 1999, B1.
Hidden Cost of Tech Support, PC World, May 1995, 143.
NetBazaar: Networked Electronic Markets for Trading Computation and Information Services, ECDL 1998—Research and Advanced Technology for Digital Libraries, 839.
Multimedia Collaborative Remote Consultation Tools via Gigabit WAN in Teleradiology, IEEE 1994 Phoenix, 417.
Multimedia Communication in a Medical Environment, IEEE 1991 Singapore I.C. on Networks, 166.
A New Teleconsultation Terminal System Using ISDN, NTT Review, Jul. 1991, 37.
MiniPay: Charging Per Click on the Web, CNISDN, 1997 v29, 939.
Caring for Customers: Real-time text chat and telephony provide personalized customer support and turn queries into sales leads, Internet World Media, Sep. 1999.
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.
Masahiko Hase, Shuji Kawakubo and Mineo Shoman, "Advanced Videophone System Using Synchronized Video Filing Equipment," NTT Review, vol. 3, No. 4 Jul. 1991, pp. 29-36.
Franco Mercalli and Roberto Negrini, "The ESSAI Teleshopping System: An Example of a Broadband Multimedia Application," Publication No. 0-7803-1820-X/94, IEEE, 1994, pp. 572-576.
Abhaya Asthana and Paul Krzyzanowski, "A Small Domain Communications System for Personalized Shopping Assistance," Proceedings of ICPWC'94, Publication No. 0-7803-1996-6/94, IEEE, 1994, pp. 199-203.
Linda Littleton, "Meet the Shadowy Future," Proceedings ACM SIGUCCS User Services Conference XXII, Ypsilanti, Michigan Oct. 16-19, 1994, pp. 205-210.
L. F. Ludwig and D.F. Dunn, "Laboratory for Emulation and Study of Integrated and Coordinated Media Communication," Conference on Office Information Systems, Mar. 23-25, 1988, Sponsored by ACM SIGOIS and IEEECS TC-OA in cooperation with IFIP W.G. 8.4, pp. 283-291.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
ISDN Tutorial:Definitions, http://www.ralphb.net/ISDN/defs.html , printed on Apr. 21, 2000.
ISDN Tutorial: Interfaces, http://www.ralphb.net/ISDN/ifaces.html , printed on Apr. 21, 2000.
KEEN.COM, "The Most Popular U.S. question and Answer Marketplace, Goes International 90 Days after Launch". PR Newswire; 3 pages, New York; Mar. 13, 2000.
U.S. Appln. No. 09/565,587, entitled System and Method for Conducting a Time Auction, filed on May 4, 2000.
U.S. Appln. No. 09/522,322, entitled System for Recording and Distributing Recorded Information Over the Internet, filed on Mar. 9, 2000.
U.S. Appl. No. 09/635,506, entitled *Method and Apparatus for Providing Group Calls via the Internet*, filed Aug. 9, 2000.
U.S. Appl. No. 09/733,872, entitled *Assistance Method and Apparatus*, filed Dec. 8, 2000.
U.S. Appl. No. 09/782,984, entitled *Assistance Method and Apparauts* filed Feb. 13, 2001.
U.S. Appl. No. 09/782,925, entitled *Assistance Method and Apparatus*, filed Feb. 13, 2001.
U.S. Appl. No. 09/702,217, entitled *An Apparatus and Method for Specifying and Obtaining Services Through Voice Commands* filed Oct. 30, 2000.
U.S. Appl. No. 09/764,021, entitled *System and Method for an Online Speaker Patch-Through*, filed Jan. 16, 2001.
U.S. Appl. No. 09/414,710, entitled *System for Providing Services in Real-Time Ocer the Internet*, filed Oct. 8. 1999.
ADS-click, "ADS-click Adds Skype-Based Pay-Per-Call Advertising Capabilities to Its Private-Labeled Solution, which will be Unveiled at ad:tech New York," Market Wire, Oct. 10, 2005.
European Patent Office, Search Report for European Patent Application No. EP4253389.3, Sep. 17, 2004.
Ingenio, Inc., "Keen: Your Personal Advisor," retrieved from http://www.keen.com, available at least by Feb. 4, 2006.

ISA/US, International Search Report for International Application No. PCT/US05/12061, 3 pages, Nov. 17, 2006.
Jingle Networks, Inc., "1-800-FREE411 Provides Two Great Opportunities to Acquire New Customers," availabe at least by Oct. 20, 2005.
Reding, Craig et al., U.S. Appl. No. 09/596,466 entitled "Methods and Apparatus for Providing Telephone Support for Internet Sales," filed Jun. 19, 2000.
U.S. Appl. No. 60/198,642, filed Apr. 20, 2000, Rothschild et al.
U.S. Appl. No. 60/471,535, filed May 19, 2003, Melideo.
Answers.com Web Page (www.answers.com).
"Applying Technology News," Accounting Technology, p. 14 (Feb./Mar. 1997).
Big Green Blog: Jan. 2005 Archives, Feb. 21, 2006.
Chris Ott, "Making Good on the Information Economy". Denver Business Journal, Dec. 17, 1999, p. 27.
Collett, Stacey & Julie King, "Why Online Browsers Don't Become Buyers," ComputerWorld, vol. 33, No. 48, p. 14 (Nov. 1999).
"Connecting to On-Line Car Shoppers: Auto Sellers Use Netcall Internet Call-Button Technology to Turn Clicks into Interactive Sales", Business Wire, p. 4089., Jul. 1999.
Cynthia Hodgson, "Online Expert Databases & Services", Econtent, Dec. 1999, p. 48-53.
Davey, Tom, "Wheeling and Dealing Online", PC Week, vol. 13, No. 45, pp. 1, 129., Nov. 1996.
Ellen Greenblatt, "Have you ever wondered . . . ", Datamation, Oct. 1997, p. 12.
EXP.com Web Site at www.exp.com/.
"Expertcity.com Launches Premier Online Marketplace for Expert Services," PR Newswire (Aug. 1999).
Gregory Dalto, "Rent-An-Expert On the Web," Information Week p. 75 (Sep. 6, 1999).
Healey, Jon, "From A to Z, You Can Sell Advice Online." Retrieved from http://www.mercurycenter.com on Oct. 24, 2000, published on Nov. 7, 1999.
Infomarkets.com Web Site (www.infomarkets.com).
Information about Expertcity.com retrieved from the Internet [http://www.expertcity.com] on Nov. 6, 2000.
Information about Expertcity.com retrieved from the Internet [URL:http://www.expertcity/com] on Apr. 9, 2000.
Ingenio Press Archives for 2004, www.ingenio.com, Feb. 21, 2006.
Intellect Exchange Web Site (www.intellectexchange.com).
"Introducing 1-800-FREE411: First Nationwide Free Telephone Directory Assiatance Service" Jingle Networks, Inc., Huntington Beach, Calif., Sep. 20, 2005.
"Jambo Launches to Connect People and businesses From the Internet to the Phone", Agoura Hills, Calif. May 3, 2005.
"Jambo Names Netzero Co-founder Stacy Haitsuka to New Post of Chief Information Officer", Agoura Hills, Calif., Jul. 5, 2005.
"Jambo Receives $5 Million in Financiing from Kline Hawkes & Co., Westlake Venture Partners, Others", Agoura Hills, Calif., Oct. 17, 2005.
Jeff Peline, "Net Firm to Connect Users by Phone," CNET News.com [retrieved from http://new.cnet.com] (Oct. 24, 2001) published Nov. 8, 1999.
Joann M. Wasik, "Information for Sale: Commercial Digital Reference and AskA Service", Virtual Reference Desk, Sep. 20, 1999, at www. vrd.org/AskA/commAskA.html.
Joseph Menn, "An Expert? There's Now a Home for You on the Internet", Los Angeles Times (retrieved from http://denverpost.com on Oct. 24, 2001).

*Keen.com, Inc.* v. *InfoRocket.com, Inc.*, Complaint for Patent Infringement, Trade Dress Infrigement and Unfair Competition; Demand for Jury Trial filed Aug. 31, 2001, pp. 1-8 plus 17 pgs. of attachments.
*Keen.com, Inc.* v. *InfoRocket.com, Inc.*, Preliminary Injunction Hearing, pp. 286-289 (Jan. 8, 2002).
Keen.com Feb. 4, 2006.
Keen.com Plans Web Service Allowing Customers to Hold Private Phone Chats, Don Clark, Wall Street Journal, Nov. 8, 1999.
"Keen.com™ Launches First Live Answer Community™, Connects People with Information to Share Over Their Standard Telephone", Press Release [retrieved from http://keen.com] (Oct. 24, 2000), published Nov. 8, 1999.
Keen.com raises $60 Million from Prestigious . . . , Business Wire, Jan. 11, 2000.
"Lucent Technology and Netscape Team to Deliver Lucent Ecommerce Solutions," Business Wire, Sep. 1998.
Michael Kanellos, "Do You Want to Know The Meaning of Life?", Computer Reseller News, Mar. 3, 1997, pp. 72-74.
Michael Rogers et al, "Experts Abound at New Web Sites", Library Journal, Mar. 1, 2000, pp. 22-24.
"Netcall Internet Call Buttons Enhance E-Commerce Customer Service and Sales", PR Newswire, p. 7431., Aug. 1999.
PCT Search Report for PCT Application No. PCT/US01/48284, filed Oct. 30, 2001 (corresponding to U.S. Appl. No. 09/702,217) mailed May 13, 2002 (7 pgs.).
Qcircuit Web Site (www.qcircuit.com).
Sell and buy advice online, The Ottawa Citizen, Nov. 29, 1999.
"Surfbrains.com: Brains online save time & money", M2 Presswire, Jul. 11, 2000.
Tehrani, Rich, "e-Rip Van Winkle and the 60 Second Nap," Call Center Solution, vol. 18, No. 2, pp. 16(3)., Aug. 1999.
The Web Site at www.experts-exchange.com/.
The web-site at www.allexperts.com.
"TriNet's, Help Me, I'm Stuck, Internet Voice Button Services Pushes Web Pages to Online Users." Business Wire, Mar. 1998.
"UpSnap Selects LookSmart to Sell Premium Listings on FREE 411 Service for Text-Enabled Cell Phones", Nov. 4, 2004.
"USA Global Link Brings Interactively to Internet Shopping," Business Wire, Oct. 1998.
"Walker Digital Issued Landmark U.S. Patent No. 5,862,223 for Global Internet Marketplace for Experts", Business Wire, Jan. 26, 1999.
Welcome to the Electronic Emissary Project's WebCenter at www.tapr.org/emmisary/.
"Welcome to Jambo—the leader in Pay-per-Call Solutions" (search results) Oct. 17, 2005.
Alexander, Kelly King et al., "1-900 (Pay-For-Information Phone Services)," Baton Rouge Business Report, vol. 9, No. 20, pp. 23-27, Jul. 30, 1991.
KEEN.COM, "The Most Popular U.S. Question and Answer Marketplace Goes International 90 Days After Launch," PR Newswire, Mar. 13, 2000.
Kempner, Matt, "SWM Seeking—the Net Rather than Newspapers," Atlanta Journal the Atlanta Constitution, p. Q1, Sep. 10, 2000.
Turco, Franco, "Legislation is Planned to Hem in 'Scooplines' Covers Revealing Rates, Blocking Service," Arizona Republic, Final Edition, Valley & State Section, p. B8, Jan. 16, 1988.

* cited by examiner

METHOD, APPARATUS AND SYSTEM FOR MARKETING, DELIVERING, AND COLLECTING PAYMENT FOR INFORMATION

BACKGROUND OF THE INVENTION

1. Field of the Invention

The invention relates to the fields of electronic mail, information processing, and provision of services over computer networks.

2. Description of the Related Art

Providers of information—whether it be lines of computer code or a digital photograph—face a difficult process when selling their product to customers. The providers can quite easily send their information product to customers (electronic mail makes such transfers almost instantaneous), but collecting the corresponding payment is considerably more complicated.

Collecting payment for information is complicated because once the information has been sent, it cannot be "returned." For instance, if an information provider sells the right to view a digital photograph, the photograph is sent to the customer and is viewed. Once it has been received and viewed, the photograph can be sent back, but the viewing has already taken place. So while the customer could claim dissatisfaction with the photograph and send it back, the value has already been transferred and cannot be "returned." For this reason, the standard mechanism of sending a product and collecting payment for it afterwards is inadequate.

In the physical world, this problem is solved by forcing customers to pay for information before they view it. Customers wishing to view a film, for instance, must pay the entrance fee before entering the theater.

In the online world, similar processes have been attempted. Customers wishing to view the information for sale at a web site must pay for a subscription before being granted access to the site.

The mechanics of this subscription model, however, are too unwieldy to be used for direct marketing. For instance, a stockbroker seeking to direct-market his stock picks to a customer would have to first send marketing materials to the customer advertising his stock picks. Then the customer would have to go to the stockbroker's web site and purchase a subscription. Then the stock picks would be sent to the customer. Not only does this process require several steps at different locations; it is also unrealistic that a customer would buy an entire subscription for a single piece of information.

There is currently no device available that enables providers of information to direct-market a single piece of information and fulfills the marketing, delivery, and billing functions in one simple step.

SUMMARY OF THE INVENTION

A method, apparatus and system for marketing, delivering, and collecting payment for information is described. In one embodiment, the invention is a method of providing electronic mail for payment. The invention includes sending an electronic mail message including provided information and a price to a customer, the provided information having an inaccessible portion of information. The invention further includes transferring a payment from the customer, and rendering the inaccessible portion of information accessible to the customer.

BRIEF DESCRIPTION OF THE DRAWINGS

The present invention is illustrated by way of example and not limitation in the accompanying figures.

DETAILED DESCRIPTION

Figure 1:
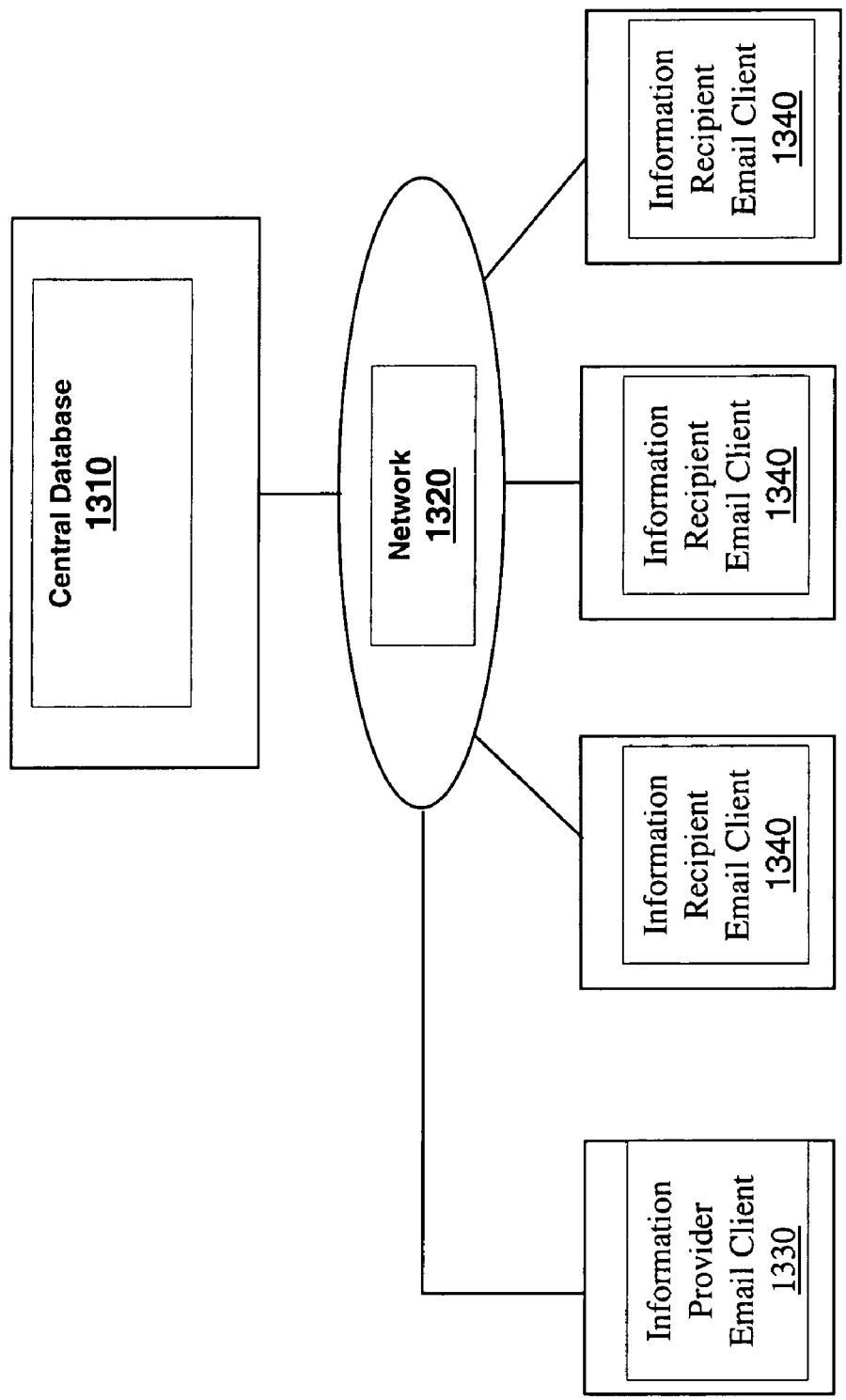
FIG. 1 illustrates an embodiment of a system for delivering paid email.

A method, apparatus and system for marketing, delivering, and collecting payment for information is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, a system by which providers of information can directly market, deliver, and collect payment for their information is illustrated. The system may enable the provider to send electronic mail to potential customers. In one embodiment, this electronic mail, however, preferably features three functions in one: 1) it advertises to the potential customer the information it contains securely inside and the price required to view or access it, 2) it enables the potential customer to open the electronic mail and view or access its contents, thereby agreeing to purchase it, and 3) the opening of the electronic mail automatically transfers payment from the customer to the provider.

Thus, it may be preferable to enable information providers to send electronic mail to their potential customers. Furthermore, it may be preferable to enable information providers to charge their customers a fee to view the contents of electronic mail. Moreover, it may be preferable to automatically transfer the fee from the customer to the information provider when the customer opens the electronic mail.

One embodiment includes a central database that stores the financial-account information of the system's users. Each user has an account with a current balance that can be utilized to purchase information. Users can add funds to their account, for example, by charging a credit card or by sending a check to the system's administrator. A user can also add funds to his/her account by selling information to other users. The central database keeps track of all of these transactions, and adds or subtracts fees from users' accounts as the transactions occur. The central database may also track and account for individual email messages, including keeping track of when the message was sent, the contents of the message, the price for viewing the message, and the status of the message (such as viewed and paid for, pending or unopened, discarded for example).

In one embodiment, if the customer elects to open an electronic mail message and view its contents, the assigned fee is automatically transferred from the customer's account to the information provider's account. The email client program communicates with the central database, transmitting the instructions to debit the customer's account and credit the provider's account with the assigned fee.

One embodiment includes an email client program that enables users to send and receive electronic mail to and from other users in the system. The email client program also enables users to assign a price to an electronic mail message. In one embodiment, the email client program enables the sender (the information provider or service provider) to include a description of what is contained within the electronic mail, enabling him/her to promote the offering. The recipient (the potential customer) can view this description without having to pay the assigned price. The recipient can then decide whether to open the electronic mail and pay the assigned price or to delete the electronic mail without viewing its contents, in which case no fee would be paid.

Effectively, the electronic mail message may include an accessible portion and an inaccessible portion, and the inaccessible portion may be rendered accessible upon payment of the price. Note that the email may contain only an inaccessible portion and a price, and that other configurations of the email may be suitable within the spirit and scope of the invention. In one embodiment, if the customer elects to open the electronic mail and view its contents, the assigned fee is automatically transferred from the customer to the information provider. Thus, in this embodiment, payment may be made directly from the customer to the information provider, thereby obviating the need for a central database. Note that such payment may take a number of different forms, including, without limitation, credit card transfers, digital cash, direct funds transfers between financial institutions, virtual points (such as miles for example), digital wallets, virtual credit cards and other payment methods for example, and that payment information rather than a literal payment may be transferred.

FIG. 1 illustrates an embodiment of a system for delivering paid email. Central Database 1310, in one embodiment, contains information such as a username and password or similar identifying information for service providers and customers, along with financial information such as credit card or other financial account numbers. Central Database 1310 may further contain account information (such as balances for example) for service providers and customers and biographical or promotional information about service providers or demographic or profile information about customers. Network 1320 is a conventional network suitable for transmission of email or other information, such as the Internet for example.

Provider email client 1330 is a computer or similar system suitable for sending and receiving email which is utilized by an information provider who is accessible through information in the central database 1310. Similarly, recipient email clients 1340 are computers or similar systems suitable for sending and receiving email which are utilized by customers who are similarly accessible through the central database 1310. Thus, in one embodiment, email may be sent from the service provider to the customers through use of the clients (1330 and 1340) and the network 1320, and may further involve interaction with the central database 1310.

Figure 2:
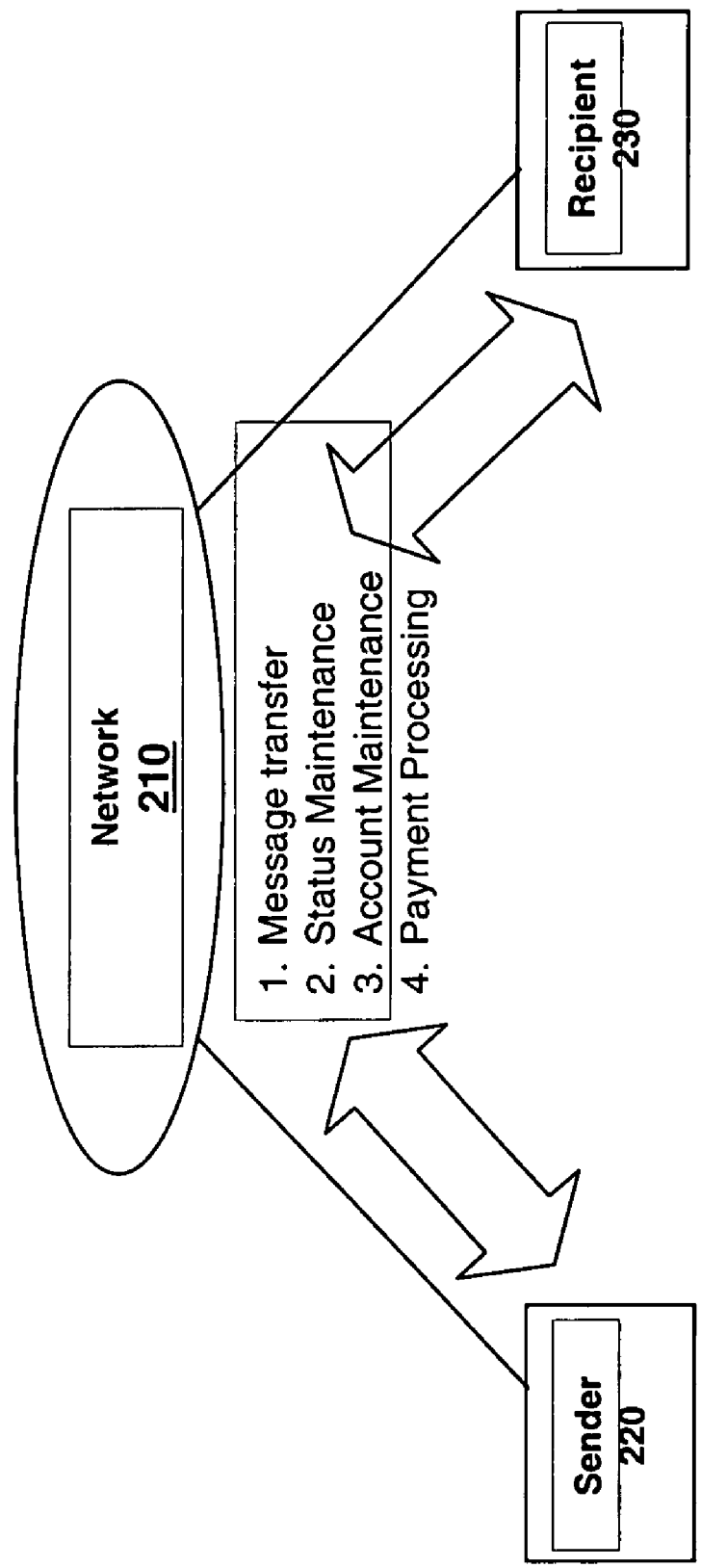
FIG. 2 illustrates an alternate embodiment of a system for delivering paid email.

FIG. 2 illustrates an alternate embodiment of a system for delivering paid email. Network 210 is a network such as the Internet or some other connection of a set of machines. Coupled to the network 210 are a sender 220 and a recipient 230 which represent machines and/or users capable of sending and receiving email or other electronic transmissions. In one instance, the sender 220 is a service provider who sends an email including a price and an inaccessible portion of the email for which the price is to be paid. The email is sent over the network 210 to the recipient 230, who may choose to pay the price to gain access to the inaccessible portion of the email or may not pay the price and discard the email. In one embodiment, some portion of the network 210 or a machine or machines therein performs the functions of message transfer, status maintenance (of messages), account maintenance and payment processing.

Figure 3:
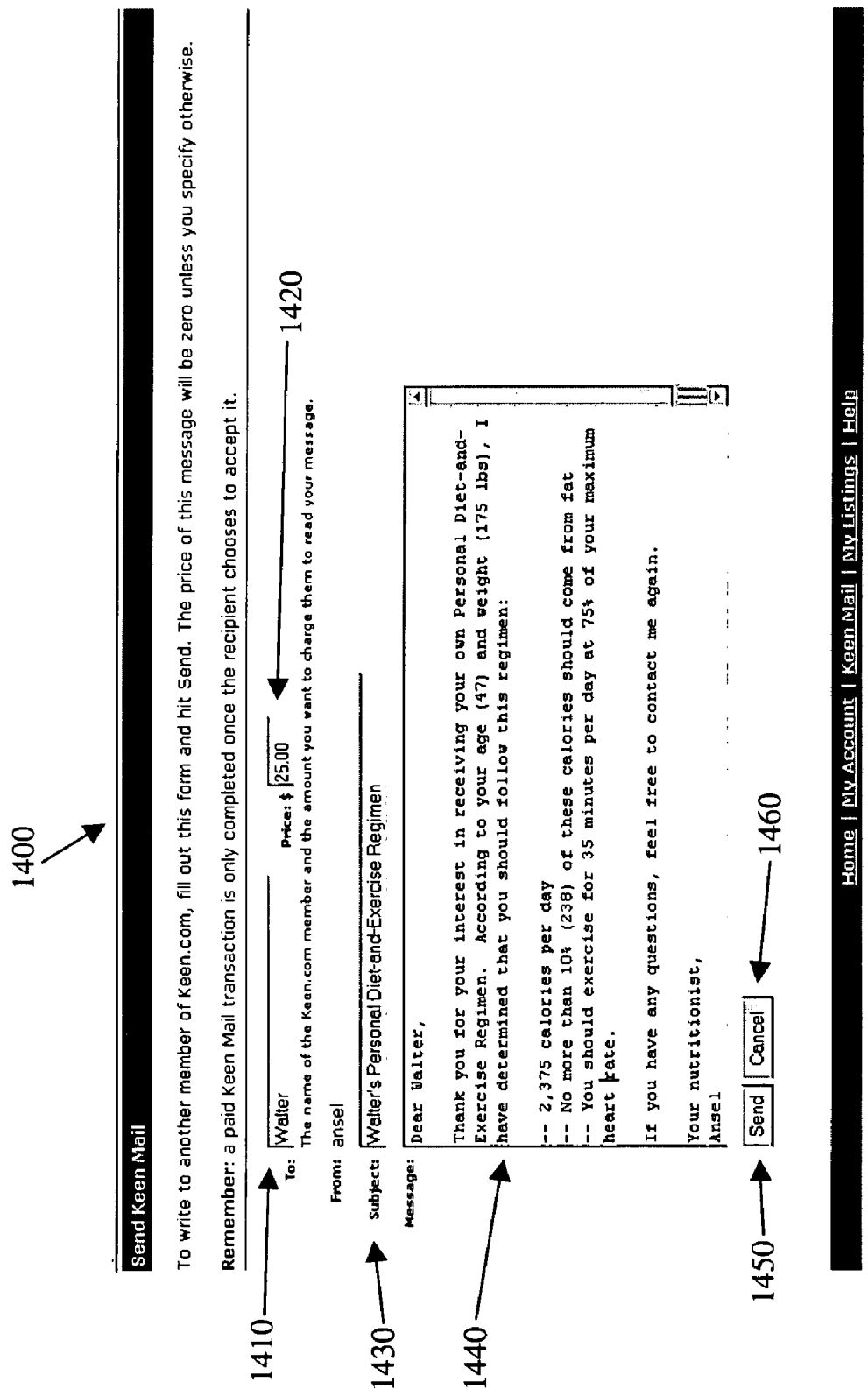
FIG. 3 illustrates an embodiment of an interface for composing email within a system.

FIG. 3 illustrates an embodiment of an interface for composing email within a system. Interface 1400 includes an addressee section 1410, a price section 1420, a subject section 1430, a message section 1440, a send button 1450, a cancel button 1460, and a navigation portion 1470. The addressee section 1410 may accept from the user of the interface information sufficient to uniquely identify a recipient (a customer for example) of an email message. The price section 1420 specifies the amount of money (in dollars and cents in one embodiment) which will be charged to the recipient should the recipient decide to accept the charges. The subject section 1430 may accept information which will be accessible by the recipient prior to payment by the recipient to the sender (a service provider for example) of the email message, and this subject section 1430 preferably describes the contents of the email in a manner which enables the recipient to make an informed decision about whether to pay for the email message.

The message section 1440 may accept the information to be transmitted to the recipient, and may be composed of simple text or of other more intricate or involved information. Preferably, the message section 1440 is only accessible to the recipient after payment of the price specified in the price section 1420, even though the message section 1440 may be delivered simultaneously with the subject section 1430 for example. Send button 1450 is a button which the composer of the email message may select to cause the message to be sent in a manner which will be apparent to those skilled in the art. Similarly, cancel button 1460 is a button which the composer of the email message may select to cause the message to be cancelled or deleted without sending the message. Navigation portion 1470 is a part of the interface which allows the composer of the message to move to other parts of a website associated with a system or otherwise leave the interface 1400.

Figure 4A:
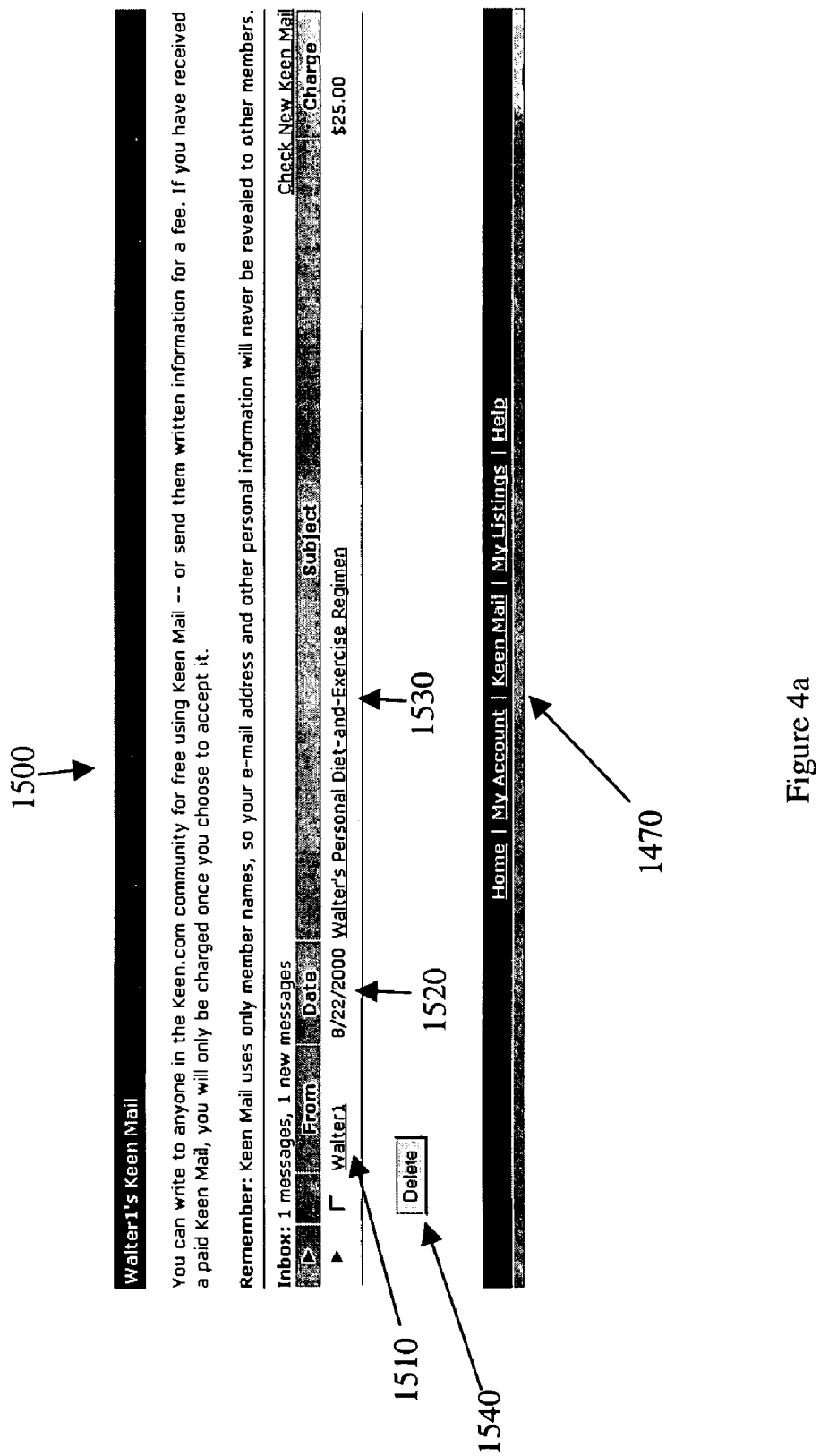
FIG. 4a illustrates an embodiment of an interface for reading or otherwise processing received email within a system.

FIG. 4a illustrates an embodiment of an interface for reading or otherwise processing received email within a system. User interface 1500 includes status information related to messages received by a customer, and may also include information concerning messages previously opened by the customer. The status information for a message received by a customer includes a name section 1510, a date section 1520, a subject section 1530, a charge section 1550 and a delete button 1540. The subject section 1530 includes the information accessible by the customer for free, and preferably includes information sufficient to allow the customer to make an informed choice about opening the message and thus incurring the charges listed in the charge section 1550. The name section 1510, in one embodiment, includes the name of the sender as it is identified on the system used for paid email distribution, but may include any identifier appropriate for illustrating the source of the message. Similarly, the date section 1520 includes information identifying when the message was sent.

The delete button 1540, in one embodiment, may be selected by the user (customer) when the customer does not agree to pay the charges (price) listed in the charge column and thus does not wish to retain or view the message. The message may be viewed, in one embodiment, by selecting the information in the subject section 1530 for the particular message. Selecting the subject section 1530, in one embodiment, causes the customer's account to be charged the price of the charge section 1550 ($25.00 in the example displayed). Upon verification that the charge to the customer's account was successful (the customer had sufficient credit for example), the information in the message which was not accessible is rendered accessible by the system, such as displaying it in a separate window for example. In an alternate embodiment, the user may observe an accessible portion of the email message to aid in determining whether to pay the fee for the inaccessible portion of the email.

Figure 4B:
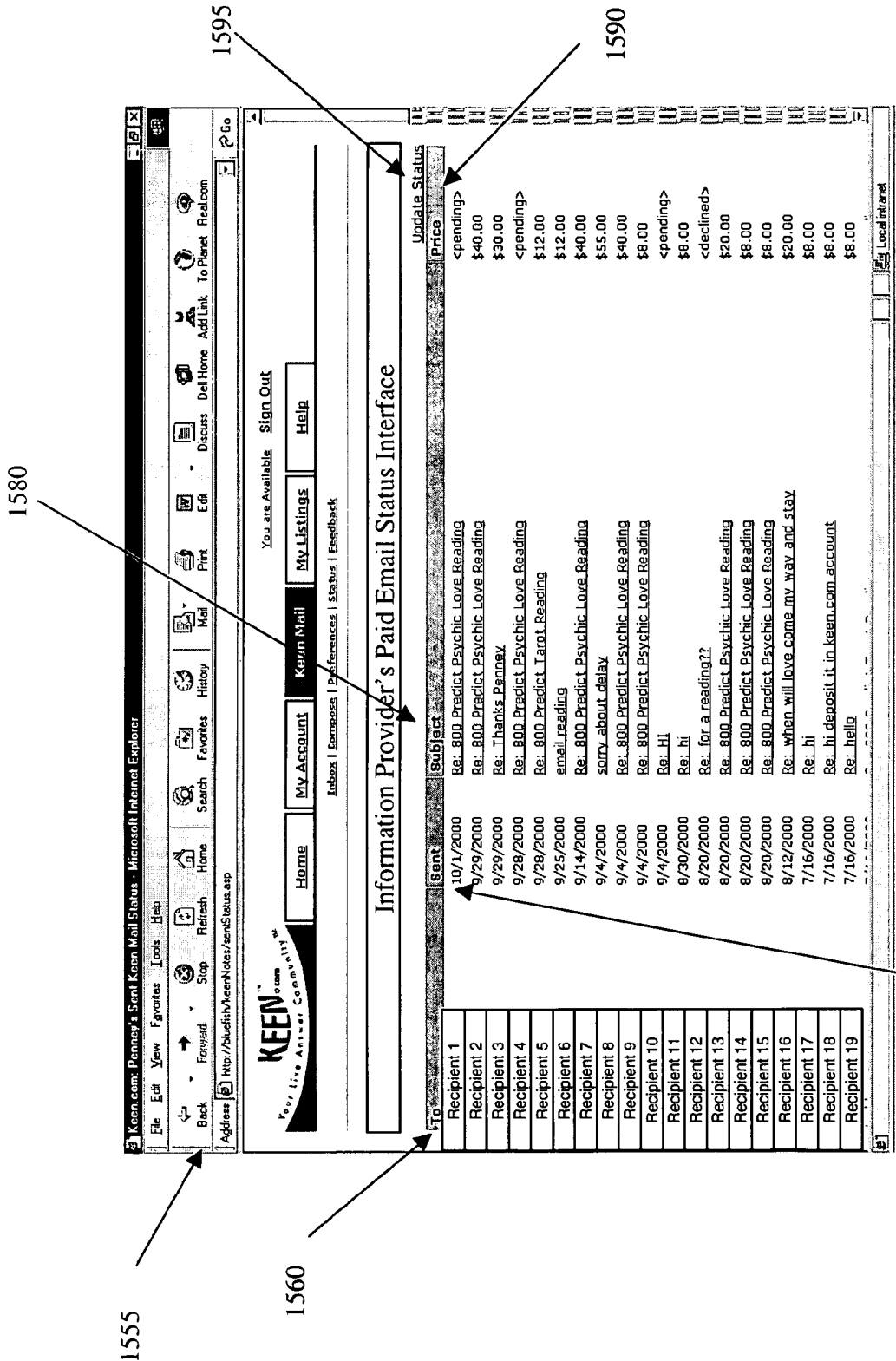
FIG. 4b illustrates an embodiment of an interface for observing status of email within a system.

FIG. 4b illustrates an embodiment of an interface for observing status of email within a system. Interface 1555 includes recipient information 1560, date information 1570, subject information 1580, price information 1590 and an update link 1595. Interface 1555 may be used to determine when a message was sent to a particular recipient, the subject of the message, whether the message was accepted, rejected, or untouched, and the price paid for an accepted message. The recipient information 1560 indicates the expected recipient of each message. The date 1570 indicates when the message was sent, or could alternatively indicate when the message was read for example. The subject 1580 indicates the subject of the message or may show an accessible portion of a message. The price 1590 indicates the price paid for an accepted message, or indicates that the message is declined (and thus discarded) or pending, and thus unopened but retained by the recipient.

The update link 1595 may be used to update the status information. In one embodiment, the user may delete messages from the status interface, which may or may not result in the same messages being deleted for the customer if they are not saved. As a result, updating status may be beneficial.

Figure 5:
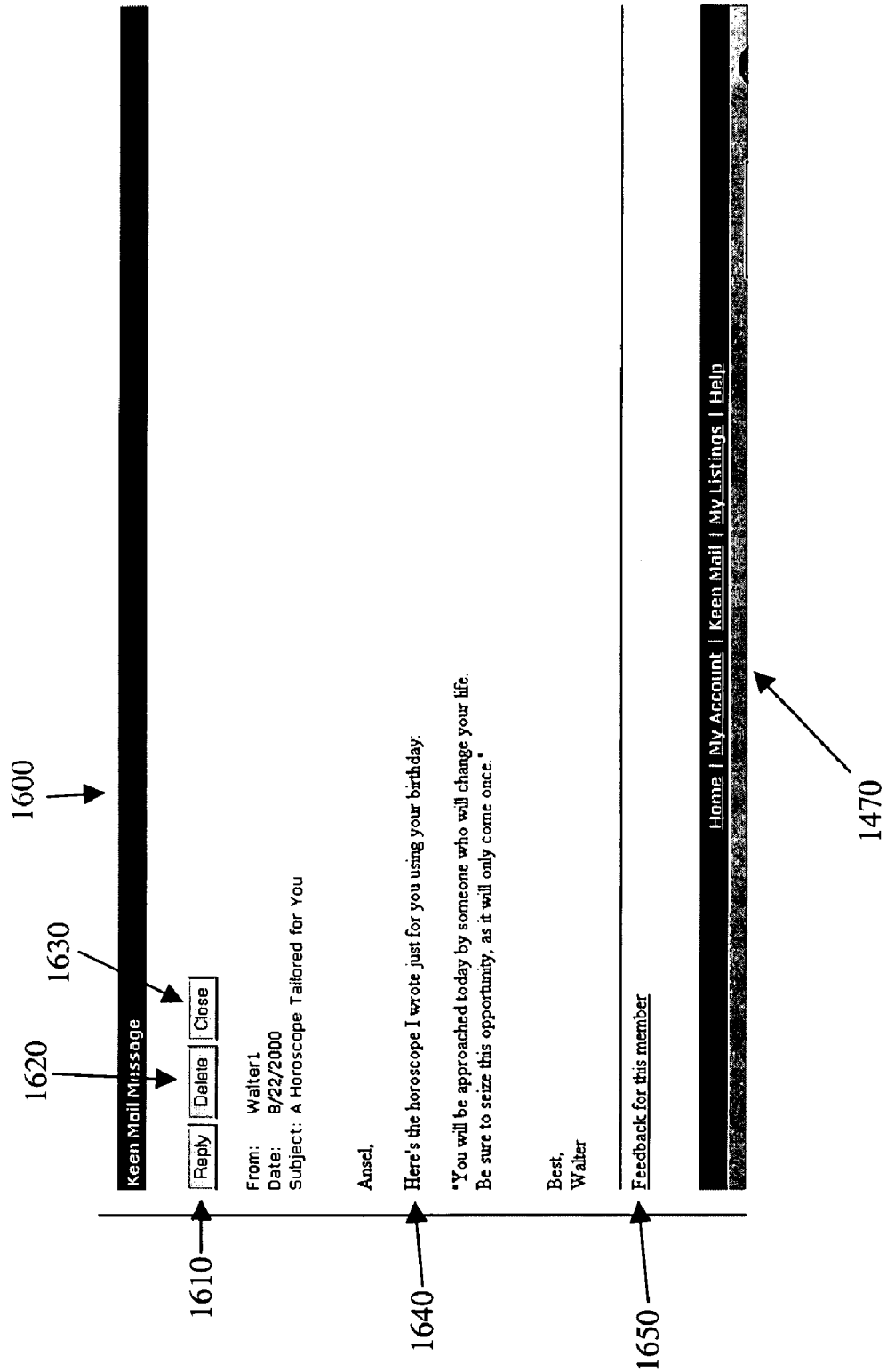
FIG. 5 illustrates an embodiment of an interface for viewing email within a system.

FIG. 5 illustrates an embodiment of an interface for viewing email within a system. Interface 1600 includes reply 1610, delete 1620 and close 1630 buttons, along with message contents 1640 and feedback link 1650. The reply 1610, delete 1620 and close 1630 buttons may be used to reply to the message, delete the message from the customer's account, or close the message (preserving it for future reference) respectively. The message contents 1640 include information which the customer has paid for and was previously inaccessible to the customer. While illustrated as text, this information may take on a variety of digitally transmittable forms, including but not limited to photographs, sound clips, motion pictures, software code, and other forms of information for example. The feedback link 1650 may be used to open a window in which feedback such as comments about the helpfulness of a service provider's products may be submitted in one embodiment.

Figure 6:
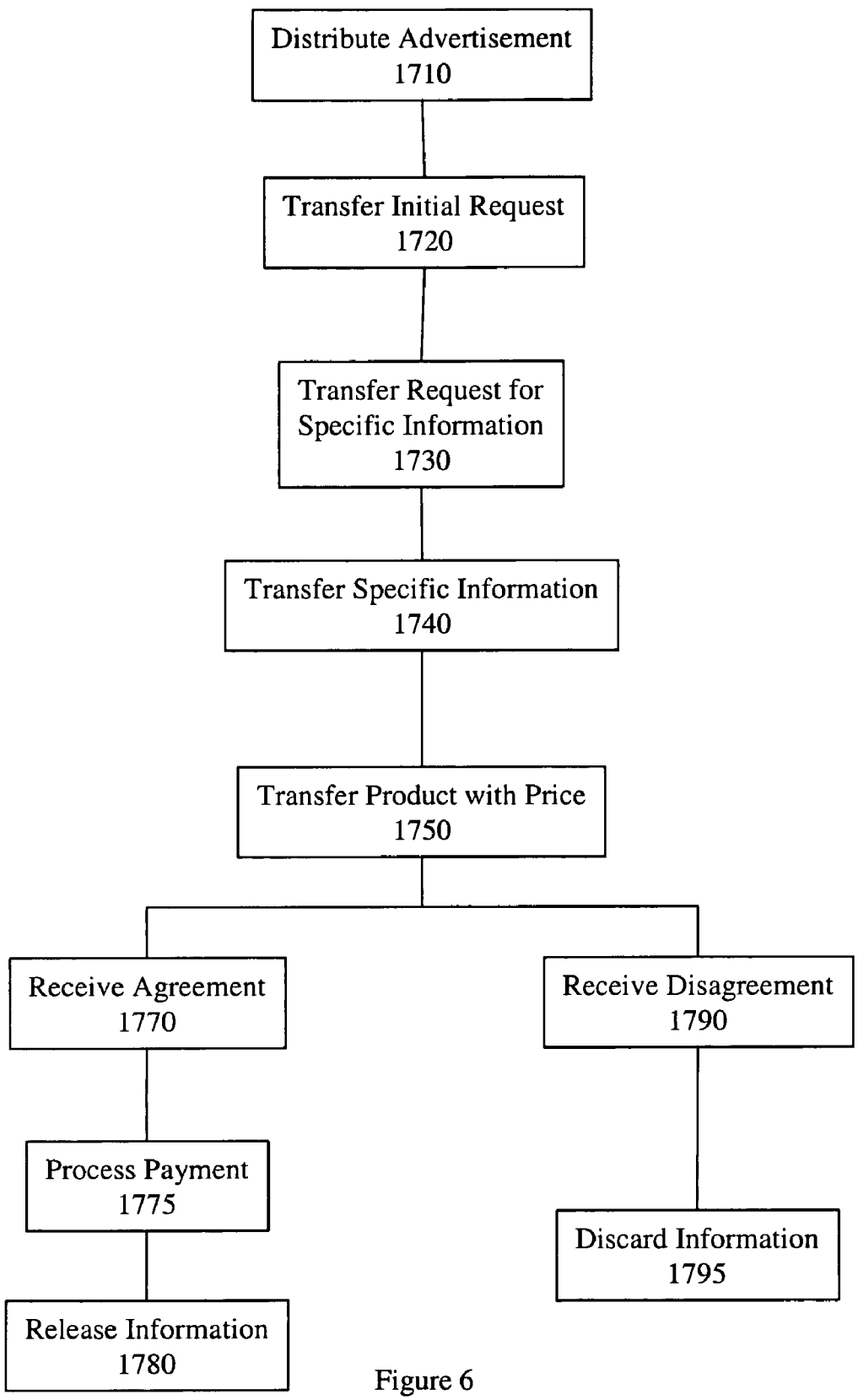
FIG. 6 illustrates an embodiment of a method of distributing email for payment.

FIG. 6 illustrates an embodiment of a method of distributing email for payment. Each of the flow diagrams presents an embodiment including various blocks which may be reordered, combined, subdivided, substituted or omitted within the spirit and scope of the invention as one skilled in the art will appreciate. In one embodiment, an advertisement of services is distributed at block 1710, such as by direct email or by listing in a directory. At block 1720, an initial request for services is transmitted from a customer to a service provider. At block 1730, if necessary, a request is transmitted from the service provider to the customer for specific information from the customer sufficient to tailor the services to the needs or desires of the customer. Likewise, at block 1740, the specific information is transmitted from the customer to the service provider as requested. At block 1750, the product is transmitted from the service provider to the customer along with the price set by the service provider for the product.

If the customer agrees to the price, at block 1770 such agreement is received and at block 1775 payment from the customer is processed. The payment may take the form of a debit to a credit account or bank account, charge to a credit card supplied by the customer, transfer of digital cash or other forms of payment for example. In one embodiment, upon proper processing of the payment, at block 1780, the inaccessible information is rendered accessible to the customer. In an alternate embodiment, upon receipt of the payment at block 1780 the inaccessible information is rendered accessible. If, on the other hand, the customer refuses to pay the price, at block 1790 this refusal or disagreement with terms is received and at block 1795 the information is discarded.

From a service provider's point of view, the service provider distributes an advertisement of services at block 1710, such as by direct email or by listing in a directory in one embodiment. At block 1720, an initial request for services is received from a customer. At block 1730, if necessary, the service provider transmits a request to the customer for specific information from the customer sufficient or necessary to tailor the services to the needs or desires of the customer. At block 1740, the specific information is received from the customer as requested. At block 1745, the service provider generates, creates, or customizes the product after taking into account the specific information. At block 1750, the service provider transmits the product to the customer along with the price set by the service provider for the product.

If the customer agrees to the price, at block 1770 such agreement is received and at block 1775 payment from the customer is processed. Note that these blocks may be transparent to the service provider, in which case the service provider will only be aware that payment was received. The payment may take the form of a debit to a credit account or bank account, charge to a credit card supplied by the customer, transfer of digital cash or other forms of payment for example. In one embodiment, upon proper processing of the payment, at block 1780, the inaccessible information is rendered accessible to the customer, without action by the service provider after sending the product and price. In an alternate embodiment, upon receipt of the payment at block 1780 the inaccessible information is rendered accessible, again without action by the service provider after sending the product and price. If, on the other hand, the customer refuses to pay the price, at block 1790 this refusal or disagreement with terms is received and at block 1795 the information is discarded. Note that the information may be retained by the service provider for future use in one embodiment even though the system discards the information, and that the service provider may merely receive notification that payment was refused and the information discarded.

From the customer's point of view, in one embodiment, an advertisement of services is received at block 1710, such as by viewing in a directory or by direct email. At block 1720, the customer sends an initial request for services to a service provider. At block 1730, if necessary, a request is received from the service provider for specific information from the customer sufficient to tailor the services to the needs or desires of the customer. Likewise, at block 1740, the customer sends the specific information to the service provider as requested. At block 1750, the product is received from the service provider along with the price set by the service provider for the product.

If the customer agrees to the price, at block 1770 such agreement is sent (along with payment) to the system and at block 1775 payment from the customer is processed. The payment may take the form of a debit to a credit account or bank account, charge to a credit card supplied by the customer, transfer of digital cash or other forms of payment for example. In one embodiment, upon proper processing of the payment, at block 1780, the inaccessible information is rendered accessible to the customer, and the customer may then use the information. In an alternate embodiment, upon receipt of the payment at block 1780 the inaccessible information is rendered accessible. If, on the other hand, the customer refuses to pay the price, at block 1790 this refusal or disagreement with terms is sent to the system and at block 1795 the information is discarded.

Note that portions of the methods or systems above may be automated and performed by logic blocks such as software executed by a processor or portions of a device or machine or circuitry. In particular, a system and/or a method for paid email may involve a processor executing instructions. Such instructions, when executed by the processor, may cause the processor to perform a method as illustrated elsewhere in this document. Such instructions may be embodied in a machine-readable medium, such as a persistent storage medium or other medium coupled to or accessible by the processor. The medium may be an electronic medium such as RAM or a variant of ROM, it may be a magnetic medium such as a disk or tape, an optical medium such as a CD-ROM, a carrier wave or other transmissive medium, or other media as appropriate. Furthermore, the instructions may be embodied in multiple media, either of a uniform type of medium or a variety of types of media.

A block diagram may be implemented as instructions in a machine-readable medium (or media) or as a set of logic blocks. Furthermore, the breakdown of portions of the system illustrated is not necessarily more or less suitable than a different division of portions of the system in which blocks are combined, subdivided or otherwise differently configured.

Figure 7:
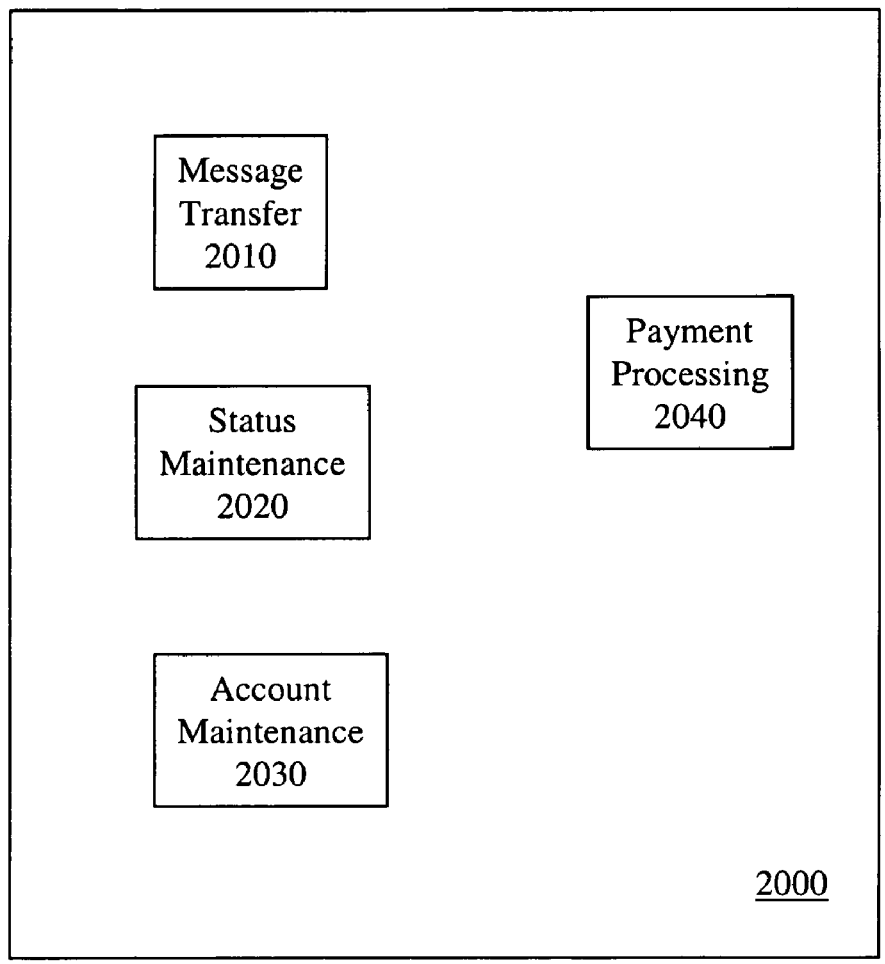
FIG. 7 illustrates an embodiment of a medium which may embody a method of transferring electronic mail or portions thereof in exchange for payment.

FIG. 7 illustrates an embodiment of a medium which may embody a method of transferring electronic mail or portions thereof in exchange for payment. The medium 2000 includes a message transfer logic block 2010, a status maintenance logic block 2020, an account maintenance logic block 2030 and a payment processing logic block 2040. In one embodiment, the message transfer logic block 2010 transfers email messages to designated recipients, including both transferring accessible portions of those email messages and rendering inaccessible portions accessible or discarding messages as appropriate. Similarly, in one embodiment, status maintenance logic block 2020 tracks which email messages have been sent and includes status information related to each messages such as whether the message was sent, when it was sent, whether it was read, whether it was discarded, and other status information as appropriate.

Furthermore, in one embodiment, account maintenance logic block 2030 tracks accounts of individual users, maintaining balances and determining whether the user may pay the price of a message sent within the system. In one embodiment, payment processing logic block 2040 processes payments which result in disbursements to the holder of an account or payments into the account, effectively processing payments to and from the real world from the system. In an alternate embodiment, payment processing logic block 2040 processes actual payments to and from users for messages, acting as an interface between the user and the account maintenance logic block 2030 each time a message is read by a customer (triggering a payment to a service provider), by providing information about the customer and service provider sufficient to identify their accounts on the system. It will be appreciated that other systems, methods and apparatuses need not maintain accounts, and need only process payments directly between customers and service providers.

Figure 8:
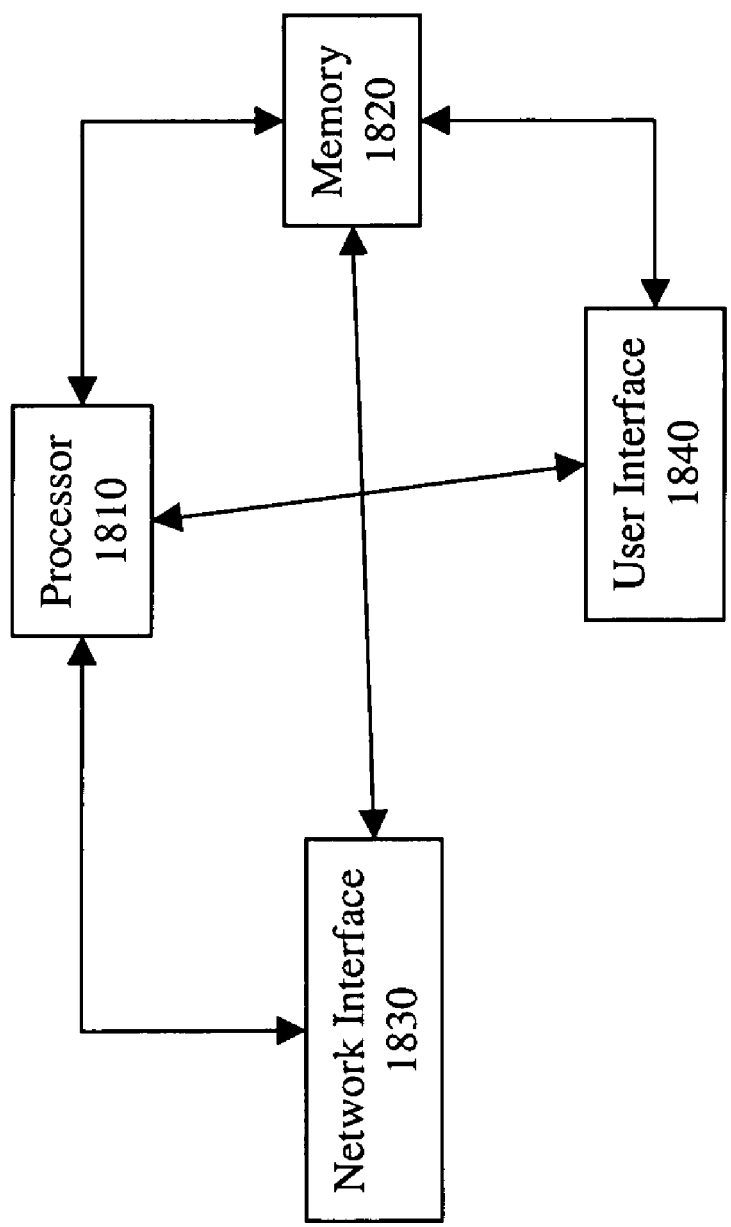
FIG. 8 illustrates an embodiment of a system which may be used for transferring electronic mail or portions thereof in exchange for payment.

FIG. 8 illustrates an embodiment of a system which may be used for transferring electronic mail or portions thereof in exchange for payment. Processor 1810 is coupled to memory 1820, network interface 1830 and user interface 1840. Likewise, memory 1820 is also coupled to network interface 1830 and to user interface 1840. In one embodiment, processor 1810 may be a general purpose microprocessor, which executes instructions stored in memory 1820. Memory 1820 may be a RAM, ROM, or other form of storage accessible by a processor, and may represent a storage subsystem. Network interface 1830 may be a subsystem or other circuitry suitable for connection to a network such as the Internet. Network interface 1830 may be implemented as a modem or Ethernet card for example. User interface 1840 may be implemented in a variety of known ways, including but not limited to keyboards, displays, touch-sensitive displays, speakers, a mouse, or other implementations. It will be appreciated that the system illustrated in FIG. 8 may be used as a system for running an email client or for otherwise sending, transferring or receiving email and paid email.

Furthermore, it will be appreciated that the prices transmitted to a customer may include a surcharge added by the system, or the payment to the service provider may be the price less a surcharge.

Application of the Invention

A nutritionist in Toronto named Diane has expertise in prescribing her clients their own personal diet-and-exercise regimens. When she knows a client's age and weight, she can prescribe a personal regimen including the number of calories one should eat per day, the maximum number of calories that should come from fat, the minutes per day one should spend exercising within a specified heart rate, etc.

Diane services clients locally in Toronto, but also has made herself available to clients around the world through her health-and-fitness website. At the website, clients can contact Diane via the subject email invention, asking her to provide them with a personal diet-and-exercise regimen.

Walter is a retiree living in Florida who seeks to improve his health and fitness. He reads about Diane at her web site and decides to contact her regarding a personal diet-and-exercise regimen. Using the subject email invention, Walter sends Diane an email requesting her services. Diane writes back, informing Walter that she can prescribe him a personal diet-and-exercise regimen for $25. She informs him that he simply needs to send her his age and weight. Walter finds the $25 price reasonable, so he writes her back an email that informs her of his age and weight.

Using Walter's age and weight, Diane prescribes him a personal diet-and-exercise regimen including the number of calories he should eat per day, the maximum number of calories that should come from fat, the minutes per day he should spend exercising within a specified heart rate, etc. She composes this text using the subject email invention. She titles the email "Walter's Personal Diet-and-Exercise Regimen." Then, in order to collect the $25 fee, she uses the subject email program to specify that the price to open this email is $25. After all, once Walter has read the email, its value has already been transferred even if he returns the email—she therefore needs to collect her fee before he views the enclosed information. After she has specified the price, she clicks "Send," which sends the electronic mail to Walter.

Walter receives Diane's email using the subject email invention. Immediately he can read the title, "Walter's Personal Diet-and-Exercise Regimen." Beneath this title appears the message: "Diane is charging $25 for you to open this email. Would-you like to open this message?" If Walter presses the "Cancel" button, the email remains closed and he will not be charged. Walter, however, would like to read Diane's message and agrees to pay the required $25. He therefore presses the "Open" button.

Upon pressing the "Open" button, Diane's message appears on his screen. He reads it and saves it for reference as he undergoes his diet-and-exercise regimen. Since Walter opened Diane's message, the subject email invention communicated with the central database, informing it to debit $25 from Walter's account and credit $25 (minus a small percentage handling fee) into Diane's account.

Diane services many clients from around the world in this way. At the end of each month, the system sends her a check in the mail for the fees she has accrued using the subject email invention.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 1 or 9 for example may be integrated into components, or may be subdivided into components. Moreover, the blocks of FIGS. 6, 7, and 8 for example represent portions of a method which, in some embodiments, may be reordered or may be organized in parallel rather than in a linear fashion. The present specification and figures are accordingly to be regarded as illustrative rather than restrictive.

What is claimed is:

1. A method implemented in an email application program, the method comprising:
    the email application program receiving an electronic mail message sent to a customer, the electronic mail message including an inaccessible portion of information and a price to access the inaccessible portion of information;
    the email application program displaying a list of received messages, with each message displayed in the list showing a field for a subject of a corresponding message in the list and a separate field for a price to access an inaccessible portion of the corresponding message in the list;
    the email application program receiving a request to access the inaccessible portion of information in the electronic mail message;
    in response to receiving the request, the email application program communicating with a central database to charge a pre-established user account pre-associated with the customer, according to the price to access the inaccessible portion of information; and
    the email application program displaying the inaccessible portion of information to the customer, in response to completion of charging the pre-established user account of the customer according to the price to access the inaccessible portion of information.

2. The method of claim 1, further comprising:
charging a surcharge for sending the electronic mail message.

3. The method of claim 2, further comprising:
maintaining status information corresponding to sending, receiving and rendering of each of the electronic mail messages of the customer.

4. The method of claim 3, further comprising:
responsive to receiving from the customer a refusal of payment for the electronic mail message, discarding the electronic mail message to prevent the electronic mail message from being listed in the email application program; and maintaining status information corresponding to the discarding and further corresponding to the refusal of payment.

5. The method of claim 4, further comprising:
transferring an initial request for information from the customer to a service provider;
wherein the electronic mail message is in response to the initial request from the customer.

6. The method of claim 5, further comprising:
distributing advertising of the service provider's services via the email application program.

7. The method of claim 6, further comprising:
transferring a request for specific information from the service provider to the customer; and
transferring the specific information from the customer to the service provider.

8. The method of claim 1, further comprising:
receiving an authorization to debit the account held by the customer.

9. The method of claim 1, further comprising:
receiving digital cash from the customer.

10. The method of claim 1, wherein:
the charging the user account includes receiving authorization to charge a credit card of the customer and charging the credit card.

11. The method of claim 1, further comprising:
receiving virtual points from the customer.

12. The method of claim 1, wherein:
the charging the user account includes receiving authorization to charge a virtual credit card of the customer and charging the virtual credit card.

13. The method of claim 1, wherein:
the charging the user account includes charging a digital wallet of the customer.

14. The method of claim 1, further comprising:
charging a surcharge for rendering the inaccessible portion accessible; and
transferring to a service provider a portion of a payment charged according to the price to access the inaccessible portion of information.

15. The method of claim 1, further comprising:
charging a surcharge for receiving a payment charged according to the price to access the inaccessible portion of information; and
transferring a portion of the payment to a service provider.

16. The method of claim 1, wherein:
the electronic mail message includes an accessible portion of information; and
the method further comprises displaying the accessible portion of information to the customer in the email application program without requiring a payment from the customer.

17. The method of claim 1, further comprising:
maintaining account balances for a service provider and the customer and adjusting the account balances to reflect a payment charged according to the price to access the inaccessible portion of information.

18. The method of claim 1, further comprising:
the email application program presenting a user interface to compose an electronic message from the customer, the user interface including a field to specify a recipient, a field to specify an inaccessible portion of the composed electronic message, and a field to specify a price payable to the customer to render the inaccessible portion of the composed electronic message accessible to the recipient.

19. The method of claim 1, wherein the pre-established user account is associated with an address of the customer for electronic email messages.

20. A system to implement an email application program, the system comprising:
a first logic block of the email application program to receive an electronic mail message sent to a customer, the electronic mail message including an inaccessible portion of information and a price to access the inaccessible portion of information, and to display a list of received messages, with each message displayed in the list showing a field for a subject of a corresponding message in the list and a separate field for a price to access an inaccessible portion of the corresponding message in the list;
a second logic block of the email application program coupled to the first logic block to communicate with a central database to charge a pre-established user account pre-associated with the customer, according to the price to access the inaccessible portion of information, in response to the email application program receiving a request to access the inaccessible portion of information; and
a third logic block of the email application program display the inaccessible portion of information to the customer, in response to completion of charging the pre-established user account of the customer according to the price to access the inaccessible portion of information.

21. The system of claim 20, further comprising:
a fourth logic block coupled to the first, second and third logic blocks and configured to maintain status information corresponding to each of the electronic mail messages of the customer; and
wherein the second logic block is further configured to transfer to a service provider a portion of a payment charged according to the price to access the inaccessible portion of information.

22. The system of claim 21, wherein:
the second logic block is further configured to receive from the customer a refusal of payment for the electronic mail message; and
the third logic block is further configured to discard the electronic mail message from the email application program.

23. The system of claim 22, wherein:
the first logic block is further configured to distribute advertising of the service provider's services, transfer an initial request for information from the customer to the service provider, transfer a request for specific information from the service provider to the customer, and transfer the specific information from the customer to the service provider.

24. The system of claim 22, wherein:
the second logic block is configured to receive a payment from the customer via: digital cash, credit card, virtual credit card, virtual points, digital wallet, an account held by the customer.

25. The system of claim 20, wherein:
the electronic mail message includes an accessible portion of information displayed in the email application program without a need for payment.

26. An apparatus to implement an email application program, the apparatus comprising:
means for the email application program receiving an electronic mail message sent to a customer, the electronic mail message including an inaccessible portion of information and a price to access the inaccessible portion of information;
means for the email application program displaying a list of received messages, with each message displayed in the list showing a field for a subject of a corresponding message in the list and a separate field for a price to access an inaccessible portion of the corresponding message in the list;
means for the email application program receiving a request to access the inaccessible portion of information in the electronic mail message;
means for the email application program communicating with a central database, in response to receiving the request, to charge a pre-established user account pre-associated with the customer, according to the price to access the inaccessible portion of information; and
means for the email application program displaying the inaccessible portion of information to the customer, in response to completion of charging the pre-established user account of the customer according to the price to access the inaccessible portion of information.

27. The apparatus of claim 26, further comprising:
means for charging a surcharge in response to the means for charging the pre-established user account pre-associated with the email application program.

28. The apparatus of claim 27, further comprising:
means for maintaining status information corresponding to rendering of each of the electronic mail messages of the customer.

29. The apparatus of claim 28, further comprising:
means for receiving from the customer a refusal of payment for the electronic mail message; and
means for discarding the electronic mail message in response to the refusal of payment.

30. The apparatus of claim 29, further comprising:
means for transferring an initial request for information from the customer to a service provider;
wherein the electronic mail message is in response to the initial request for information from the customer.

31. The apparatus of claim 30, further comprising:
means for distributing advertising of the service provider's services via the email application program displaying the electronic mail messages of the customer.

32. The apparatus of claim 31, further comprising:
means for transferring a request for specific information from the service provider to the customer; and
means for transferring the specific information from the customer to the service provider.

33. The apparatus of claim 26, wherein:
the means for charging the user account comprises means for receiving an authorization to debit an account held by the customer.

34. The apparatus of claim 26, wherein:
the means for charging the user account comprises means for transferring digital cash from the customer.

35. The apparatus of claim 26, wherein:
the means for charging the user account comprises means for receiving authorization to charge a credit card of the customer and means for charging the credit card.

36. The apparatus of claim 26, wherein:
the means for charging the user account comprises means for transferring virtual points from the customer.

37. The apparatus of claim 26, wherein:
the means for charging the user account comprises means for receiving authorization to charge a virtual credit card of the customer and means for charging the virtual credit card.

38. The apparatus of claim 26, wherein:
the means for charging the user account comprises means for receiving authorization to charge a digital wallet of the customer and means for charging the digital wallet.

39. The apparatus of claim 26, further comprising:
means for charging a surcharge for rendering the inaccessible portion of information accessible; and
means for transferring to a service provider a portion of a payment charged according to the price to access the inaccessible portion of information.

40. The apparatus of claim 26, further comprising:
means for charging a surcharge for receiving a payment charged according to the price to access the inaccessible portion of information; and
means for transferring a portion of the payment to a service provider.

41. The apparatus of claim 26, wherein:
the electronic mail message includes an accessible portion of information displayed via the email application program without a payment from the customer.

42. The apparatus of claim 26, wherein:
the means for charging the user account comprises means for maintaining account balances for a service provider and the customer and means for adjusting the account balances to reflect a payment charged according to the price to access the inaccessible portion of information.

43. A machine-readable medium embodying instructions, the instructions causing the processor to perform a method implemented in an email application program, the method comprising:
the email application program receiving an electronic mail message sent to a customer, the electronic mail message including an inaccessible portion of information and a price to access the inaccessible portion of information;
the email application program displaying a list of received messages, with each message displayed in the list showing a field for a subject of a corresponding message in the list and a separate field for a price to access an inaccessible portion of the corresponding message in the list;
the email application program receiving a request to access the inaccessible portion of information in the electronic mail message;
in response to receiving the request, the email application program communicating with a central database to charge a pre-established user account pre-associated with the customer, according to the price to access the inaccessible portion of information; and
the email application program displaying the inaccessible portion of information to the customer, in response to completion of charging the pre-established user account of the customer according to the price to access the inaccessible portion of information.

44. The machine-readable medium of claim 43, the method further comprising:
charging a surcharge for sending the electronic mail message.

45. The machine-readable medium of claim 44, the method further comprising:
maintaining status information corresponding to rendering of each of the electronic mail messages of the customer.

46. The machine-readable medium of claim 45, the method further comprising:
receiving from the customer a refusal of a payment for the electronic mail message; and
discarding the electronic mail message in response to the refusal of the payment.

47. The machine-readable medium of claim 46, the method further comprising:
transferring an initial request for information from the customer to a service provider.

48. The machine-readable medium of claim 47, the method further comprising:
distributing advertising of the service provider's services.

49. The machine-readable medium of claim 48, the method further comprising:
transferring a request for specific information from the service provider to the customer; and
transferring the specific information from the customer to the service provider.

50. The machine-readable medium of claim 43, wherein:
charging the user account includes receiving an authorization to debit an account held by the customer.

51. The machine-readable medium of claim 43, wherein:
charging the user account includes transferring digital cash from the customer.

52. The machine-readable medium of claim 43, wherein:
charging the user account includes receiving authorization to charge a credit card of the customer and charging the credit card.

53. The machine-readable medium of claim 43, wherein:
charging the user account includes transferring virtual points from the customer.

54. The machine-readable medium of claim 43, wherein:
charging the user account includes receiving authorization to charge a virtual credit card of the customer and charging the virtual credit card.

55. The machine-readable medium of claim 43, wherein:
charging the user account includes receiving authorization to charge a digital wallet of the customer and charging the digital wallet.

56. The machine-readable medium of claim 43, the method further comprising:
charging a surcharge for rendering the inaccessible portion accessible; and
transferring to a service provider a portion of a payment charged according to the price to access the inaccessible portion of information.

57. The machine-readable medium of claim 43, the method further comprising:
charging a surcharge for receiving a payment charged according to the price to access the inaccessible portion of information; and
transferring a portion of the payment to a service provider.

58. The machine-readable medium of claim 43, wherein:
the electronic mail message includes an accessible portion of information displayed to the customer by the email application program without a request for payment.

59. The machine-readable medium of claim 43, wherein:
charging the user account comprises maintaining account balances for a service provider and the customer and adjusting the account balances to reflect a payment charged according to the price to access the inaccessible portion of information.

60. A system, comprising:
a processor;
a memory coupled to the processor;
a network connection coupled to the processor;
wherein the processor is configured to operate an email application program which:
receives an electronic mail message sent to a customer, the electronic mail message including an inaccessible portion of information and a price to access the inaccessible portion of information;
displays a list of received messages, with each message displayed in the list showing a field for a subject of a corresponding message in the list and a separate field for a price to access an inaccessible portion of the corresponding message in the list;
receives a request to access the inaccessible portion of information in the electronic mail message;
in response to the request, communicates with a central database to charge a pre-established user account pre-associated with the customer, according to the price to access the inaccessible portion of information; and
displays the inaccessible portion of information to the customer, in response to completion of charging the pre-established user account of the customer according to the price to access the inaccessible portion of information.

61. The system of claim 60, wherein the processor is further configured to:
charge a surcharge for sending the electronic mail message.

62. The system of claim 61, wherein the processor is further configured to:
maintain status information corresponding to rendering of each of the electronic mail messages of the customer.

63. The system of claim 62, wherein the processor is further configured to:
receive from the customer a refusal of payment for the electronic mail message; and
discard the electronic mail message in response to the refusal of payment.

64. The system of claim 63, wherein the processor is further configured to:
transfer an initial request for information from the customer to a service provider.

65. The system of claim 64, wherein the processor is further configured to:
distribute advertising of the service provider's services.

66. The system of claim 65, wherein the processor is further configured to:
transfer a request for specific information from the service provider to the customer; and
transfer the specific information from the customer to the service provider.

67. The system of claim 66, wherein the processor is further configured to:
receive an authorization to debit an account held by the customer according to the price to access the inaccessible portion of information.

68. The system of claim 60, wherein the processor is further configured to:
transfer digital cash from the customer according to the price to access the inaccessible portion of information.

69. The system of claim 60, wherein the processor is further configured to:
receive authorization to charge a credit card of the customer and charge the credit card according to the price to access the inaccessible portion of information.

70. The system of claim 60, wherein the processor is further configured to:
transfer virtual points from the customer according to the price to access the inaccessible portion of information.

71. The system of claim 60, wherein the processor is further configured to:
receive authorization to charge a virtual credit card of the customer and charge the virtual credit card according to the price to access the inaccessible portion of information.

72. The system of claim 60, wherein the processor is further configured to:
receive authorization to charge a digital wallet of the customer and charge the digital wallet according to the price to access the inaccessible portion of information.

73. The system of claim 60, wherein the processor is further configured to:
charge a surcharge for rendering the inaccessible portion accessible; and
transfer to a service provider a portion of a payment charged according to the price to access the inaccessible portion of information.

74. The system of claim 60, wherein the processor is further configured to:
charge a surcharge for receiving a payment charged according to the price to access the inaccessible portion of information; and
transfer a portion of the payment to a service provider.

75. The system of claim 60, wherein:
the electronic mail message includes an accessible portion of information displayed to the customer in the email application program without a need for a payment from the customer.

76. The system of claim 60, wherein the processor is further configured to:
maintain account balances for a service provider and the customer and adjust the account balances to reflect a payment charged according to the price.

* * * * *